United States Patent [19]
Golioto

[11] Patent Number: 6,058,816
[45] Date of Patent: May 9, 2000

[54] ACTIVELY CONTROLLABLE SUPPORT DEVICE FOR A CANTILEVER BEAM

[75] Inventor: Igor Golioto, Fairfield, N.J.

[73] Assignee: General Dynamics Advanced Technology Systems, Greensboro, N.C.

[21] Appl. No.: 08/810,463

[22] Filed: Feb. 28, 1997

[51] Int. Cl.[7] .................................. B23B 3/00; B23B 5/00
[52] U.S. Cl. .............................. 82/1.11; 82/1.2; 82/117; 82/158; 82/903; 82/904
[58] Field of Search .............................. 82/1.11, 1.2, 117, 82/158, 161, 903, 904; 408/8, 11

[56] References Cited

U.S. PATENT DOCUMENTS

| | | | |
|---|---|---|---|
| 2,903,916 | 9/1959 | Carlstedt | 82/914 |
| 3,154,973 | 11/1964 | Hack | 408/2 |
| 4,047,469 | 9/1977 | Sakata | 82/1.11 |
| 4,431,276 | 2/1984 | Weber . | |
| 4,893,914 | 1/1990 | Hancock et al. . | |
| 5,170,103 | 12/1992 | Rouch et al. | 82/158 |
| 5,264,752 | 11/1993 | Savicki . | |
| 5,314,254 | 5/1994 | Yashar et al. . | |
| 5,493,165 | 2/1996 | Smith et al. . | |

FOREIGN PATENT DOCUMENTS

| | | | |
|---|---|---|---|
| 1364400 | 1/1988 | Russian Federation | 82/1.2 |
| 1404187 | 6/1988 | Russian Federation | 82/1.2 |
| 001814987 A1 | 5/1993 | Russian Federation | 82/1.2 |
| 2112679 | 7/1983 | United Kingdom | 82/1.2 |

*Primary Examiner*—Andrea L. Pitts
*Assistant Examiner*—Toan Le
*Attorney, Agent, or Firm*—Jenner & Block

[57] ABSTRACT

Apparatus is disclosed for supporting a beam having a longitudinal axis. The apparatus includes a clamping assembly that surrounds and grips a portion of the beam. The clamping assembly is relatively compliant to deflections of the beam in at least one direction transverse to the axis, but relatively resistant to axial displacements of the beam and to torsional rotations of the beam about the axis. The apparatus further includes at least one actuator situated externally to the beam and arranged to urge the beam in the compliant direction or directions.

22 Claims, 9 Drawing Sheets

FIG. 12 ical phenomenon, often referred to as chatter, tends to arise during metal-turning operations. Undesired displacements of the boring bar, due to chatter, degrade the surface quality of the finished workpiece. Chatter tends to become more prevalent as the boring bar is made longer, and as the depth-of-cut or feedrate is increased. As a result, there is often a tradeoff among surface quality, throughput, and bore length. In particular, the potentiality for chatter severely limits the surface quality that can be obtained, at reasonable cost, in long bores. By way of example, products that are made with such long bores include aircraft engine parts, gun barrels, and high-performance pump parts.

ACTIVELY CONTROLLABLE SUPPORT DEVICE FOR A CANTILEVER BEAM

GOVERNMENT CONTRACT

This invention was made with Government support under Contract F33615-94-C-4440 with the United States Air Force. The Government has certain rights in this invention.

FIELD OF THE INVENTION

This invention relates to apparatus for supporting a cantilever beam and for applying controllable deflective forces to such beam. More particularly related are active control devices for suppressing vibrations in cantilevered, tool-supporting bars during machining operations. Still more particularly, this invention relates to a device for suppressing chatter in a boring bar.

ART BACKGROUND

It has long been known that a troublesome vibrational phenomenon, often referred to as chatter, tends to arise during metal-turning operations. Undesired displacements of the boring bar, due to chatter, degrade the surface quality of the finished workpiece. Chatter tends to become more prevalent as the boring bar is made longer, and as the depth-of-cut or feedrate is increased. As a result, there is often a tradeoff among surface quality, throughput, and bore length. In particular, the potentiality for chatter severely limits the surface quality that can be obtained, at reasonable cost, in long bores. By way of example, products that are made with such long bores include aircraft engine parts, gun barrels, and high-performance pump parts.

Practitioners in the metal-cutting arts have tried various stratagems for suppressing unwanted mechanical vibrations, including chatter. Passive suppression techniques attempt to dissipate vibrational energy in dense viscous fluids, viscoelastic pads, and the like. In some of these approaches, energy is dissipated when the free motion of one or more massive inertial bodies is opposed by frictional or viscoelastic forces.

Another approach to the suppression of vibrations in a mechanical system involves techniques from the well-known field of active control. In active control, a sensor or array of sensors detects unwanted vibrations and sends information about these vibrations to a signal processor. In response, the signal processor sends driving signals to a mechanical actuator or array of mechanical actuators. The actuator or actuator array applies forces to the mechanical system that are devised to at least partially counteract the unwanted vibrations.

Numerous techniques are known for computing, within the signal processor, appropriate counteracting forces. These techniques include, for example, classical linear feedback techniques, and adaptive feedback techniques using finite impulse response (FIR) or infinite impulse response (IIR) filters.

U.S. patent application Ser. No. 08/640,396, filed by R. Benning et al. on Apr. 30, 1996, describes one such computing technique that is especially useful in the presence of vibrational noise that is periodically regenerated by rotation, such as the rotation of a workpiece on a lathe.

U.S. Pat. No. 5,170,103, which issued to K. E. Rouch et al. on Dec. 8, 1992 (hereinafter, "the Rouch patent"), describes one application of active control methods to the chatter problem. The Rouch patent discloses a motion sensor and a force generator mounted near the free end of a boring bar (or other cantilevered beam-like member). The boring bar has a hollow portion, and the force generator is mounted within this portion. The force generator includes an inertial mass which is fastened via a hinge to the boring bar. The force generator further includes an actuator, and an element such as a spring for applying a restoring force to the inertial mass.

Although it is useful, the device disclosed by the Rouch patent has an inherent limitation. That is, the boring bar to be used with this device must be made large enough in diameter to enclose the force generator. However, the force generator cannot be made arbitrarily small. Therefore, this device cannot be used within bores smaller than a minimum diameter determined by practical limits on the miniaturization of the force generator. Current technology limits the diameter of the enclosing boring bar to about five centimeters or more.

Moreover, current approaches, including that described in the Rouch patent, involve an actuator that is integral with the boring bar. Because ordinary boring bars cannot be used, the practitioner must choose between obtaining many special boring bars at great expense, or working with a limited selection of boring bars.

Thus, until now, active control systems have lacked a device for mechanical actuation that is adaptable for use with multiple boring bars, and in particular, for use with boring bars of arbitrary diameter.

SUMMARY OF THE INVENTION

I have invented a device for supporting a boring bar, and for applying mechanical actuation to the boring bar. My device is adaptable for use with a boring bar of arbitrary diameter. In experimental metal-turning operations, my device has achieved surface finishes of substantially better quality than any achievable (at comparable turning speeds) using conventional equipment and techniques. Indeed, the surface quality achieved by my device surpasses that achieved using any passive or active method of vibration control known in the prior art.

In a broad aspect, my invention involves apparatus for supporting a beam having a longitudinal axis. The apparatus includes a clamping assembly that surrounds and grips a portion of the beam. The clamping assembly is relatively compliant to deflections of the beam in at least one direction transverse to the axis, but relatively resistant to axial displacements of the beam and to torsional rotations of the beam about the axis. The apparatus further includes at least one actuator situated externally to the beam and arranged to urge the beam in the compliant direction or directions.

In certain specific embodiments, the beam is a boring bar. The clamping assembly is part of a boring machine, and it is intended to support the boring bar. At least two actuators are situated outside of the boring bar. These actuators are arranged to apply external, transverse forces to the boring bar, so as to rotationally deflect the boring bar in at least one compliant direction about an axis passing through the boring bar.

DETAILED DESCRIPTION

Figure 1:
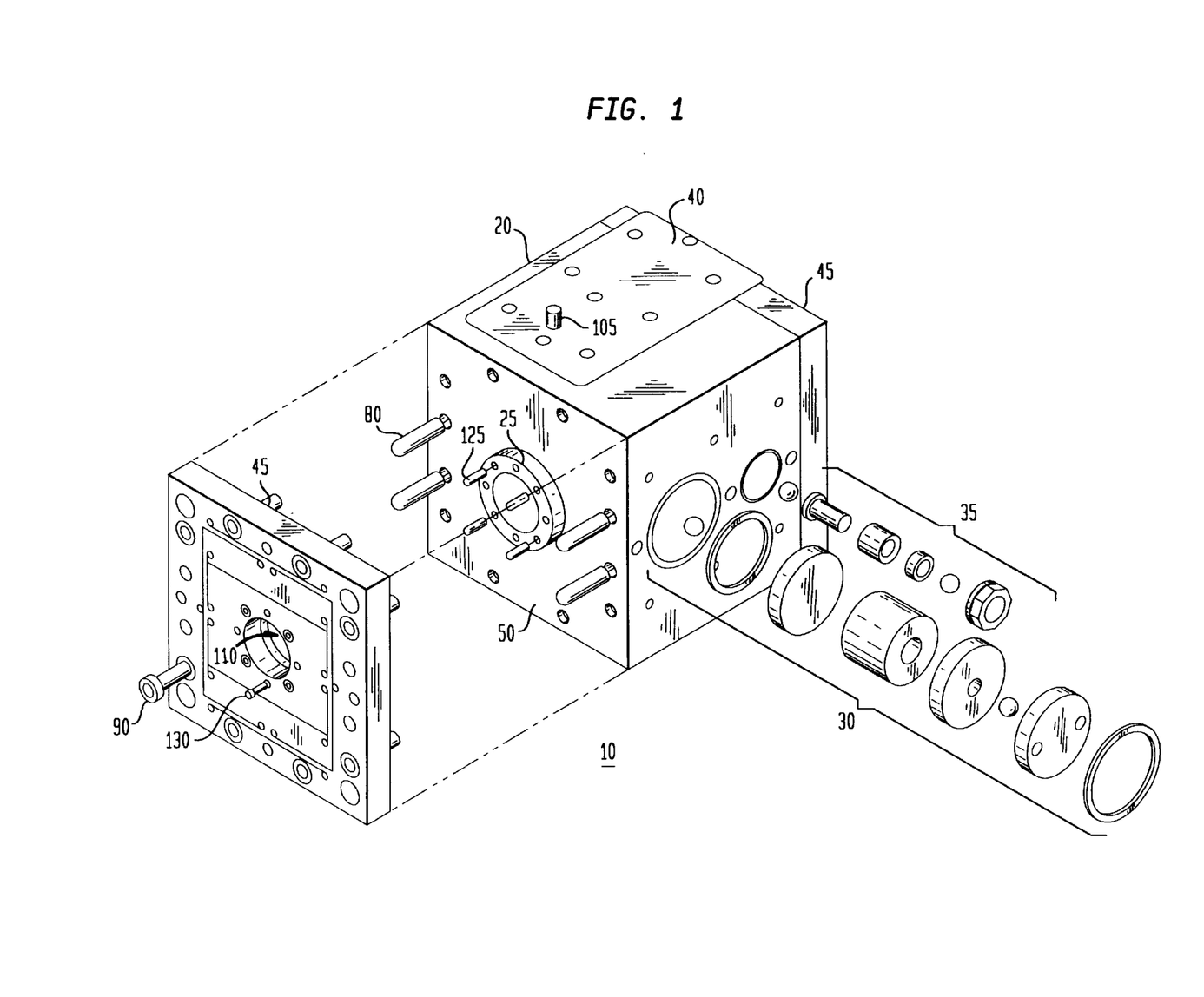
FIG. 1 is an exploded, perspective view of the inventive support apparatus in one embodiment.

The support apparatus depicted in FIG. 1 is best understood when reference is also made to FIGS. 2–4 and 6, which provide more detailed views of various portions of the depicted apparatus. In the figures, like reference numerals refer to like elements of the depicted apparatus.

As shown in FIG. 1, the illustrative support apparatus 010 includes clamp body 020, collet 025, at least two actuation assemblies 030, and at least two spring assemblies 035. The illustrative apparatus further includes at least one opposing pair of cover plates 040, and an opposing pair of support plates 045.

Clamp body 020 is a box-shaped body made, e.g., from solid 4140 steel, and having exemplary outer dimensions of 20 cm×20 cm×20 cm. In use, the clamp body is bolted from a side or back face to an appropriate fixed surface.

Figure 2:
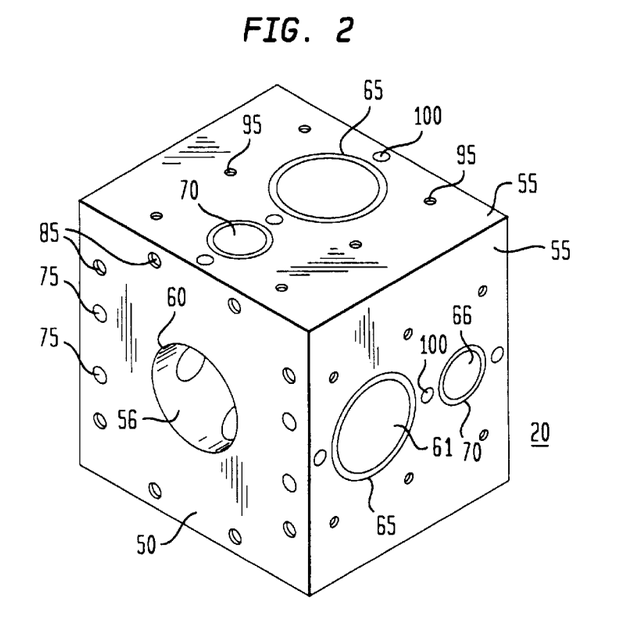
FIG. 2 is a perspective view of the clamp body of the apparatus of FIG. 1.
Figure 3:
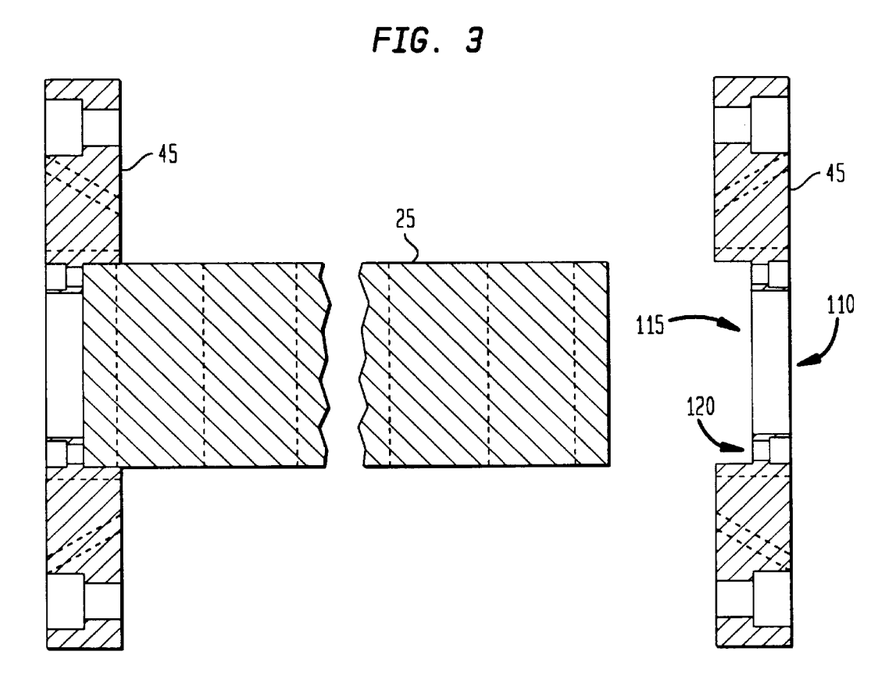
FIG. 3 is a partially schematic sectional view of the apparatus of FIG. 1, showing the end-mounting of a collet.

As shown most clearly in FIG. 2, the clamp body has an opposed pair of support faces 050, and at least one opposed pair of actuation faces 055. A hole 056 passes through the clamp body perpendicularly to the support faces, defining in each support face a circular aperture 060 for receiving an end portion of collet 025. By way of example, I have found that a clearance of 31 mil (0.81 mm) is sufficient to permit a full stroke of the collet without interference. A hole 061 passes through each actuation face perpendicularly to the actuation faces and to hole 056. Hole 061 interpenetrates with hole 056. The intersection of each hole 061 with the corresponding actuation face defines a circular aperture 065. During assembly, an actuation assembly 030 is advantageously inserted through each respective aperture 065. Opposing each hole 061 is a hole 066 that passes through a respective actuation face and interpenetrates with hole 056. The intersection of each hole 066 with the corresponding actuation face defines a circular aperture 070. During assembly, a spring assembly 035 is advantageously inserted through each respective aperture 070.

Holes 075 are advantageously defined in each support face for receiving dowel pins 080. As shown in FIG. 1, dowel pins 080 are useful for aligning each support plate 045 relative to its corresponding support face 050. Holes 085 are advantageously defined in each support face for receiving screws 090. As shown in FIG. 1, screws 090 are useful for mounting each support plate 045 to its corresponding support face 050.

Each cover plate 040 is advantageously mounted to the clamp body using screws, which are, e.g., received in screw holes 095. Entry holes 100 are advantageously defined in each actuation face for inserting therethrough set screws 105. Set screws 105 are received within corresponding, threaded holes in the collet, as described below. These set screws are advantageously used to secure a boring bar within the collet.

Defined in each support plate 045 is a circular aperture 110 for inserting a boring bar therethrough (with clearance). As shown most clearly in FIG. 3, a circular recess 115 is advantageously defined in the inward face of each support plate, for receiving therein an end portion of collet 025. Defined between aperture 110 and recess 115 is a shoulder 120. An end of the collet butts against the shoulder. Dowel pins 125 position the collet relative to shoulder 120, and screws 130 mount the collet to the shoulder. The support plates are exemplarily made from 2.5-cm steel plate.

Figure 4:
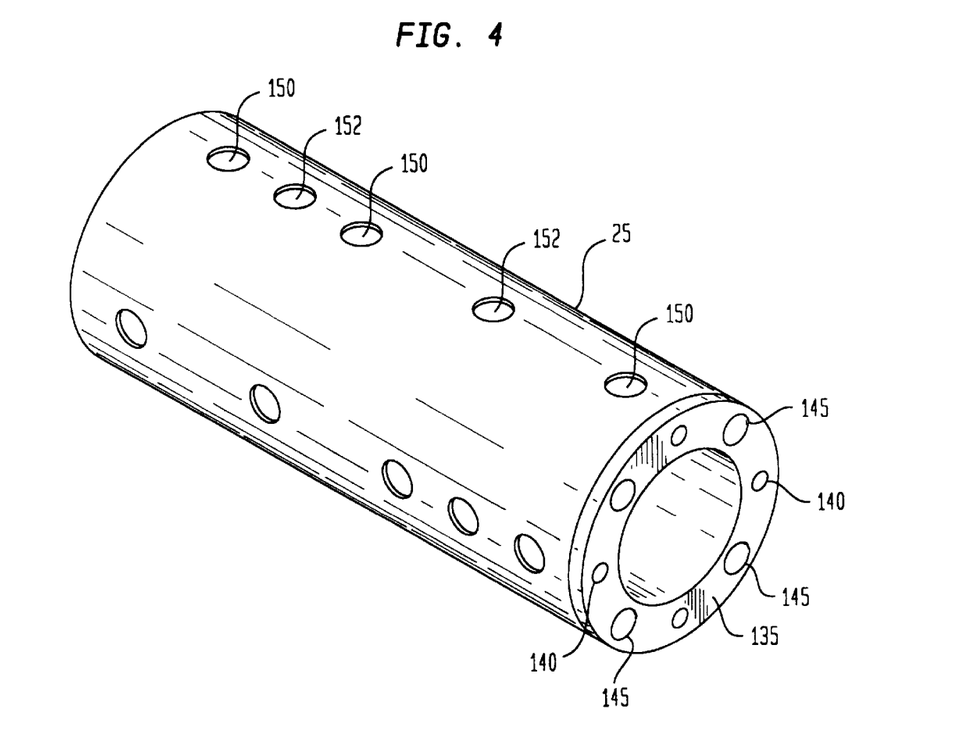
FIG. 4 is a perspective view of a collet of, e.g., the apparatus of FIG. 1.

As most clearly shown in FIG. 4, collet 025 is a tube, exemplarily of steel 1 cm in thickness. One appropriate steel composition is 4140 hardened steel. The bore of collet 025 is just large enough to slidingly receive a boring bar therewithin. The length of the collet is advantageously at least three times the diameter of the boring bar. Empirical evidence has shown that adequate stability is generally achieved by supporting the boring bar along such a relative length.

The collet has end faces 135 for mounting to respective shoulders 120. Holes 140 are provided in each end face for receiving dowel pins 125, and holes 145 are provided for receiving screws 130. Holes 150 are provided for receiving set screws 105, which secure the boring bar within the collet. Also defined on the surface of the collet are depressions 152. These depressions partially receive steel balls that are used to transmit the actuation forces, as explained in detail below. Such a ball-and-socket configuration is advantageous because it generally improves contact and mechanical stability, and decreases wear on the joint.

As depicted in FIG. 1, the collet is mounted in such a way that it can be deflected in two transverse directions, namely, the vertical and horizontal directions relative to the view of the figure. These deflections are produced by rotations of the collet about, respectively, a horizontal and a vertical axis. These deflections are permitted because certain portions of the support plates can undergo elastic deformations, as described in greater detail below.

In other embodiments of the invention, the support plates are conformed in such a way that deflections of the collet are permitted in one transverse direction only. An example of such a support plate is described below.

For convenience, we shall refer to a collet mounted in this way as a collet that is "floating" in at least one transverse direction, which lies in a corresponding "plane of flotation" perpendicular to the axis of rotation. It should be understood that the faceplates will generally exert elastic restoring forces on the collet when it is deflected. Therefore, use of the term "floating" should not be taken to imply that the collet is in any sense free of forces in the floating plane or floating direction.

Figure 5:
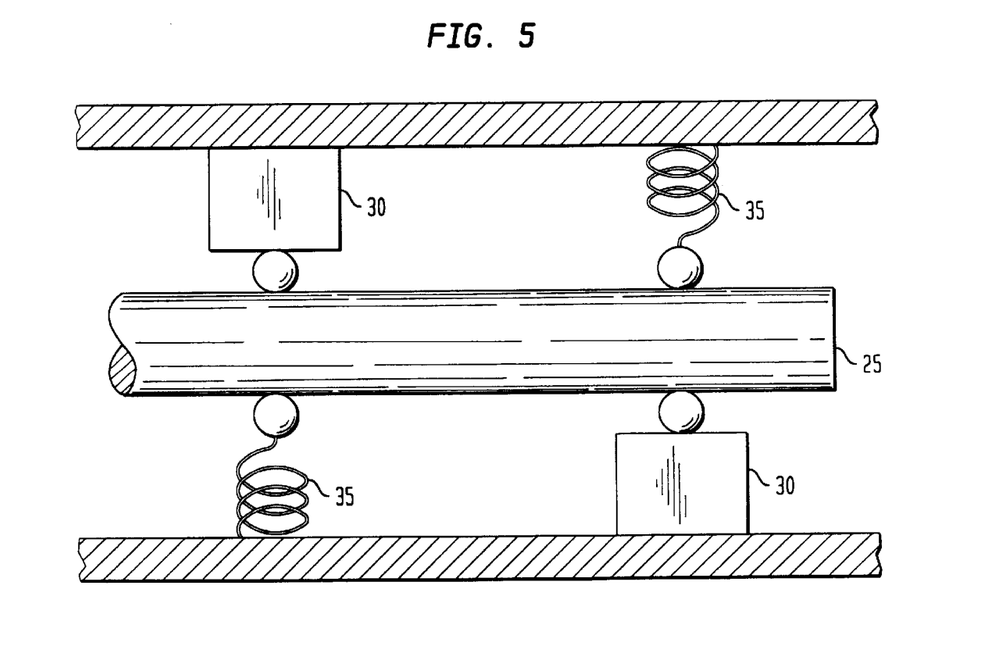
FIG. 5 is a highly schematic sectional view of the apparatus of FIG. 1, illustrating the opposition of actuators and springs.

As shown schematically in FIG. 5, each actuation assembly 030 is desirably directly opposed by a corresponding spring assembly 035. We shall refer to each opposed pair of such assemblies as an "actuator-spring pair". In exemplary embodiments of the invention, two actuator-spring pairs are provided for each plane of flotation.

The spring assembly includes a compression spring. The purpose of the spring assembly is to provide a restoring force opposite to the forward actuation direction, and to assure that the collet remains in constant contact with the corresponding actuation assembly.

Figure 6:
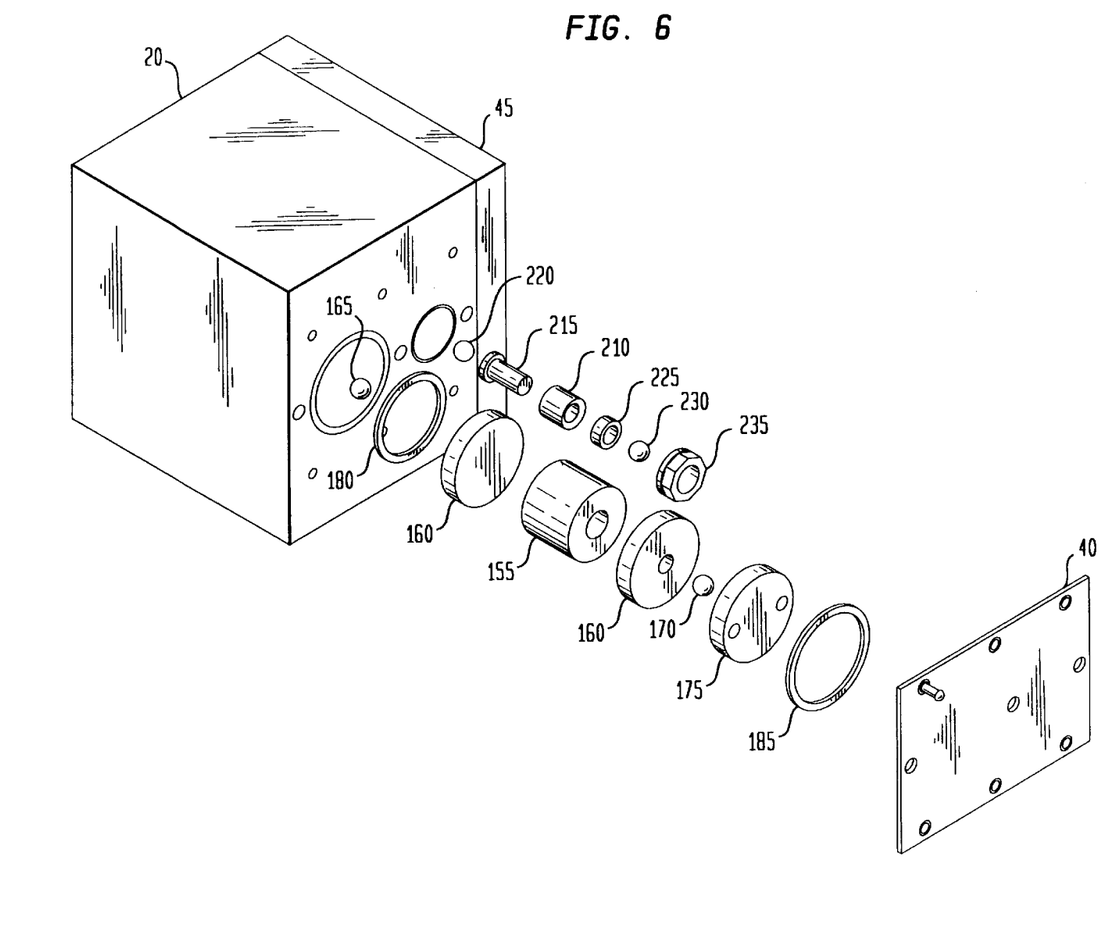
FIG. 6 is a magnified view of a portion of FIG. 1, illustrating details of the actuation assemblies.

As shown most clearly in FIG. 6, each exemplary actuation assembly includes at least one electromechanical actuator 155, which is advantageously a piezoelectric stack. As explained below, we have found it advantageous to include the piezoelectric stack between a pair of steel end rings 160. Each end ring, in turn, transmits actuation forces through a steel ball 165, 170 partially received within the central aperture of the ring on the side facing away from the actuator. The inner ball 165 makes direct contact to the collet. The outer ball 170 butts against plug 175, which is threaded and screws into aperture 065.

It will be appreciated that actuation of the collet causes the collet to undergo a rocking motion in each plane of flotation. If a flat plate were to contact the collet for transmitting actuation forces thereto, the resulting mechanical system might be over-constrained. The use of steel balls for this purpose is advantageous because over-constraint of the collet motion is avoided, and mechanical articulation is thereby improved.

It will also be appreciated that piezoelectric elements are often too brittle to withstand direct contact with a single ball during operation. The use of end rings 160 is advantageous because these rings reduce the contact stress between the steel balls and the piezoelectric stack.

O-rings 180 and 185 are advantageously provided to exclude externally applied fluids, such as cutting lubricants, from the neighborhood of each piezoelectric stack. The inner one of the end rings 160 includes a circumferential groove (not shown) for receiving O-ring 180. This O-ring provides a slideable seal against the inner surface of hole 061. Each actuation face 055 includes a circular groove, concentric with aperture 065, for receiving O-ring 185. This O-ring forms a compressive seal against cover plate 040.

We have found that for actuation of a boring bar 5 cm in diameter, advantageous mechanical stability, and an advantageous match of produceable to required loads, are obtained using piezoelectric stacks that are, coincidentally, also 5 cm in diameter. Processes for making piezoelectric stacks are well known and widely published. In particular, we believe that the process described in U.S. Pat. No. 5,493,165 will be advantageous for preparing piezoelectric stacks that are more than two or three centimeters in diameter.

In fact, we believe that piezoelectric stacks smaller in diameter than the boring bar can also be used successfully. For example, we believe that the invention can be operated using stacks 1 cm in diameter to actuate a 5-cm-diameter boring bar. When such relatively small piezoelectric stacks are used, it will generally be advantageous for each actuation assembly to employ multiple stacks.

Figure 7:
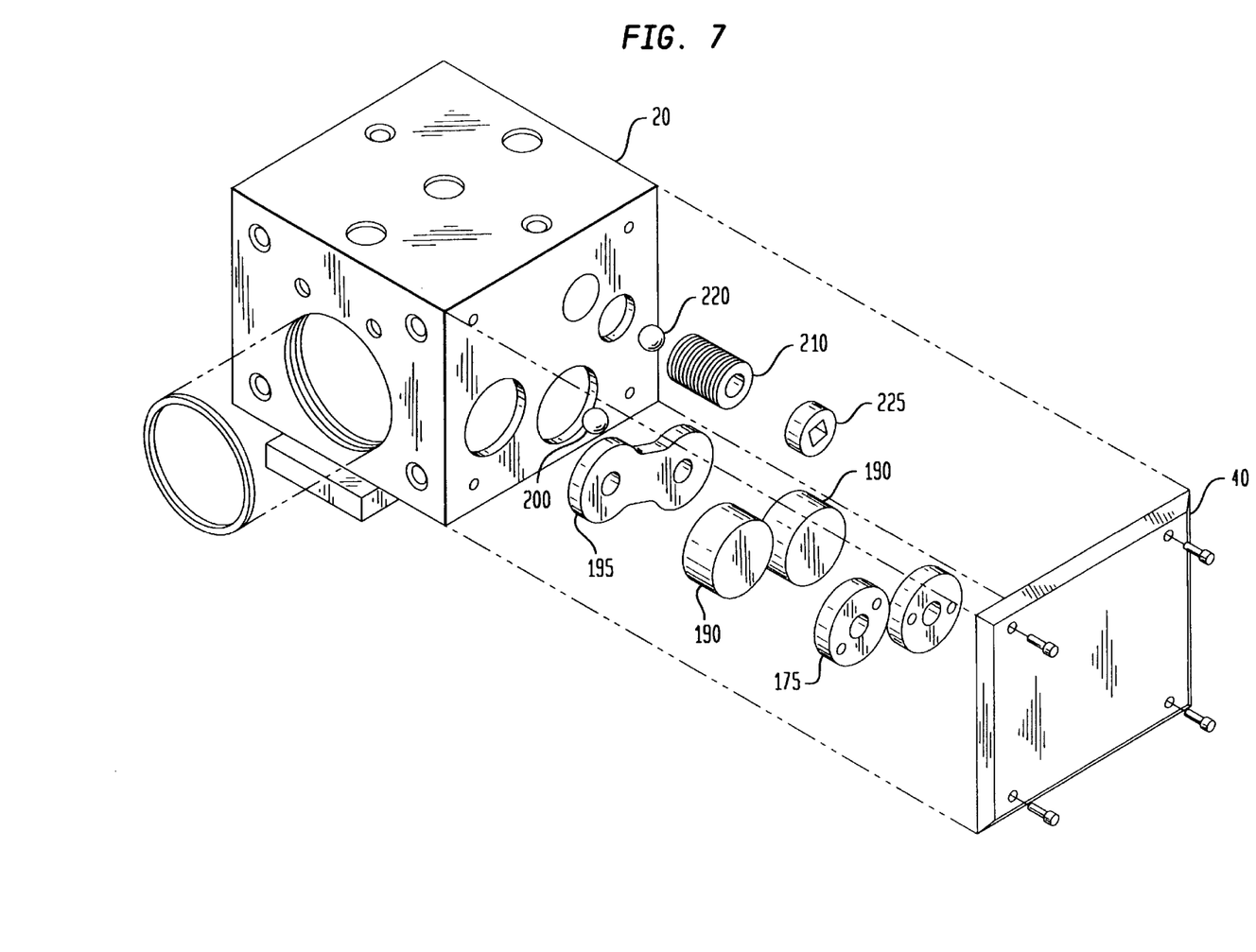
FIG. 7 is a partial, exploded perspective view of an alternate embodiment of the invention using two actuator stacks per actuation assembly.

For example, FIG. 7 shows a clamp body having an actuation face adapted to receive a tandem pair of piezoelectric stacks 190. The inward-facing side of each stack 190 makes contact with a respective end portion of yoke 195. Yoke 195, in turn, transmits mechanical forces to the collet through steel ball 200.

Turning back to FIG. 6, the exemplary spring assembly includes spring 210. Spring 210 transmits force inwardly through spring end piece 215 and steel ball 220. Outward forces are transmitted through spring cap 225 and steel ball 230 to plug 235. Plug 235 is threaded and screws into aperture 070. The spring endpiece and spring cap are desirably made from steel.

Spring 210 is shown in the figure in an annular conformation. For mechanical stability and as an aide for assembly, spring end piece 215 is advantageously conformed as a spring post (as shown), having a tube-like projection that slidingly fits within the central bore of spring 210. The central bore of the spring post continues through a wider, flange-like base, where this bore partially receives steel ball 220. Similarly, spring cap 225 advantageously includes a central bore that partially receives steel ball 230. One convenient spring 210 of annular conformation is provided as a stack of Belleville spring washers.

Each of the support plates 045 includes an arrangement of suspension springs that permits flotation of the collet in one or two transverse directions, as discussed above.

Figure 8:
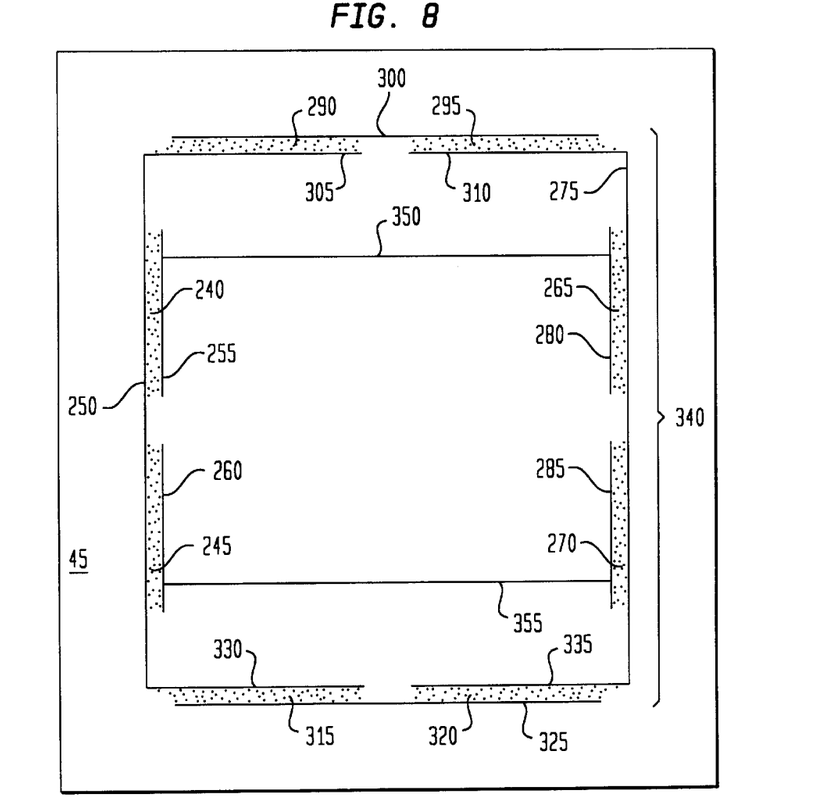
FIG. 8 is a partially schematic frontal view of a support plate according to the embodiment of FIG. 1.

FIG. 8 depicts, in a partially schematic fashion, a support plate adapted for flotation of the collet in two transverse directions. Suspension springs are defined in the support plate by a pattern of grooves. Although these grooves can be made by various machining operations, we have found it advantageous to cut these grooves by the process known as Electrical Discharge Machining (EDM). This process is particularly desirable because it affords fine control over the width of the grooves that are produced. The groove width is important because it defines the maximum permissible travel of the floating collet. A typical width for the grooves in current implementations of the invention is 0.25 mm. Such a width is readily achieved using, e.g., EDM techniques. grooves cut therethrough.

As shown in the figure, cooperating beam spring portions 240 and 245 are defined between outer vertical groove 250 and inner vertical grooves 255 and 260, respectively, and cooperating beam spring portions 265 and 270 are defined between outer vertical groove 275 and inner vertical grooves 280 and 285, respectively.

Similarly, cooperating beam spring portions 290 and 295 are defined between outer horizontal groove 300 and inner horizontal grooves 305 and 310, respectively, and cooperating beam spring portions 315 and 320 are formed between outer horizontal groove 325 and inner horizontal grooves 330 and 335, respectively. As described herein, each cooperating pair of beam spring portions constitutes a beam spring.

Outer plate 340 is defined by grooves 250, 275, 305, 310, 330, and 335. Vertical deflections of the outer plate are afforded by rocking of beam spring portions 290, 295, 315, and 320.

Inner plate 345 is defined by grooves 255, 260, 280, and 285, together with horizontal grooves 350 and 355. Horizontal deflections of the inner plate are afforded by rocking of beam spring portions 240, 245, 265, and 270.

Horizontal displacements (as viewed in the figure) are permitted by rocking of beam spring portions 240, 245, 265, and 270. Vertical displacements (as viewed in the figure) are permitted by rocking of beam spring portions 290, 295, 315, and 320. On the other hand, torsional displacements of outer plate 340 and inner plate 345 about the axis perpendicular to the support plate are resisted because such displacements would require the extension and contraction of the beam springs. Rotation of the inner and outer plates about vertical or horizontal axes lying in the plane of the support plate is resisted because any such rotation would require a deformation distributed over the full plate thickness.

Thus, the length and width of each beam spring should be chosen to permit a desired degree of travel in the floating directions while providing enough torsional stiffness to keep axial rotation of the collet within tolerable levels.

In an exemplary embodiment of the invention, each beam spring portion has a length and width (measured in the plane of FIG. 8) of 1.25 inch (32 mm) and 0.2 inch (5.1 mm), respectively. The grooves defining the sides of each beam spring (e.g., grooves 250, 255, 260) are exemplarily 1.25 inch (32 mm) deep. This depth is achieved in 1-inch (25-mm) plate by tilting the grooves, as described below.

The dimensions of the beam springs should be chosen such that the support plates are relatively stiff to torsional and axial displacements of the boring bar, but relatively compliant to lateral displacements in the plane or planes of flotation.

This criterion can be described more fully with reference to the combined suspension system for the boring bar, which includes the assembled support plates, clamp body, and actuators. It is also helpful in this regard to make reference to the various elastic properties of the boring bar envisaged as a rigidly supported cantilever beam. Such properties are described herein as "inherent" to the boring bar.

Desirably, the stiffness of the combined suspension system to torsional displacements and to axial displacements (of the boring bar) should be greater than the corresponding inherent stiffnesses of the boring bar. Preferably, the combined suspension system should be stiffer by at least tenfold in the torsional and axial directions. By making the suspension system so much stiffer, the practitioner can reduce to insignificance the contribution of the suspension system to the effective compliance of the boring bar in the torsional and axial directions.

In the combined suspension system, the predominant contribution to these stiffnesses comes from the support plates.

Desirably, the stiffness of the combined suspension system to lateral displacements in the floating plane or planes should also be greater than the corresponding inherent stiffness of the boring bar (i.e., the lateral cantilever beam stiffness). Preferably, the combined suspension system should be stiffer by at least threefold in the floating direction or directions. As explained above, it is desirable to reduce the contribution that the suspension system makes to the effective compliance of the boring bar. However, the requirement for stiffness in these directions is relaxed somewhat by the corrective effect of the actuators.

Moreover, it is desirable for the predominant contribution to this stiffness to come from the actuation assemblies, rather than from the support plates. More specifically, it is desirable for the lateral stiffness of the support plates to be less than the corresponding inherent stiffness of the boring bar. Preferably, the support plates have no more than one-half the inherent stiffness. Greater stiffness of the support plates leads to inefficiencies because the actuators must expend significant energy in flexing the beam springs.

The assembled support plates and clamp body (excluding the actuators) may be described as "relatively resistant" or "relatively compliant" to a given type of deflection. For purposes of this discussion, the assembly is deemed relatively resistant to deflections of a first kind and relatively compliant to deflections of a second kind if, for a typical boring bar (or, for other applications, another appropriate cantilever beam), the assembly has more than the pertinent inherent stiffness in the first instance and less than the pertinent inherent stiffness in the second instance.

As noted, the operation of the actuators produces a rocking motion of the collet in each plane of flotation. Typically, the two actuators in a given plane are energized in parallel, so that their respective actuation forces are applied in tandem. The center of rotation of the collet under these forces need not necessarily lie at the geometrical center of the collet. However, for design simplicity (and in particular, to permit the use of nominally identical actuators at each end, and to assure that each actuator sees approximately the same loads), we have found it advantageous to place the center of rotation at the center of the collet (or nearly so, as permitted by normal tolerances in fabrication and assembly).

Those skilled in the art will appreciate that, if the rocking angle of the collet is not constrained more narrowly by the width of the grooves in the support plate, the maximum rocking angle will be determined by the maximum axial elongation of the actuator, and by the axial distance from the point of application of the actuation force to the center of rotation. This maximum angle should be chosen to provide a useful range of motion of the cutting tool at the working end of the boring bar. This range of motion will be determined by the maximum angle of rotation and by the distance from the cutting tool to the center of rotation.

Those skilled in the art will also appreciate that the choice of longitudinal separation D between the actuator-spring pairs (in a given plane of flotation) affects not only the stiffness of the support apparatus to transverse deflections, but also the maximum force that can be delivered by the actuators to the cutting tool. Thus, a value of D should be chosen that is consistent with the choices made for beam spring dimensions, and with the force desired at the cutting tool.

In an exemplary embodiment of the invention, the maximum rocking angle is 0.06 degrees. The separation D is 2.5 inch (64 mm) in each plane of flotation. A 2-inch (5.1 cm) boring bar extends 24 inches (61 cm) from the front support plate, and 28 inches (71 cm) from the center of rotation of the collet. The resulting maximum deflection of a cutting tool at the working end of the boring bar is 28 mil (0.7 mm). I have found that with this design, more than 50 pounds (220 Newtons) of force is readily delivered to the cutting tool.

Figure 9:
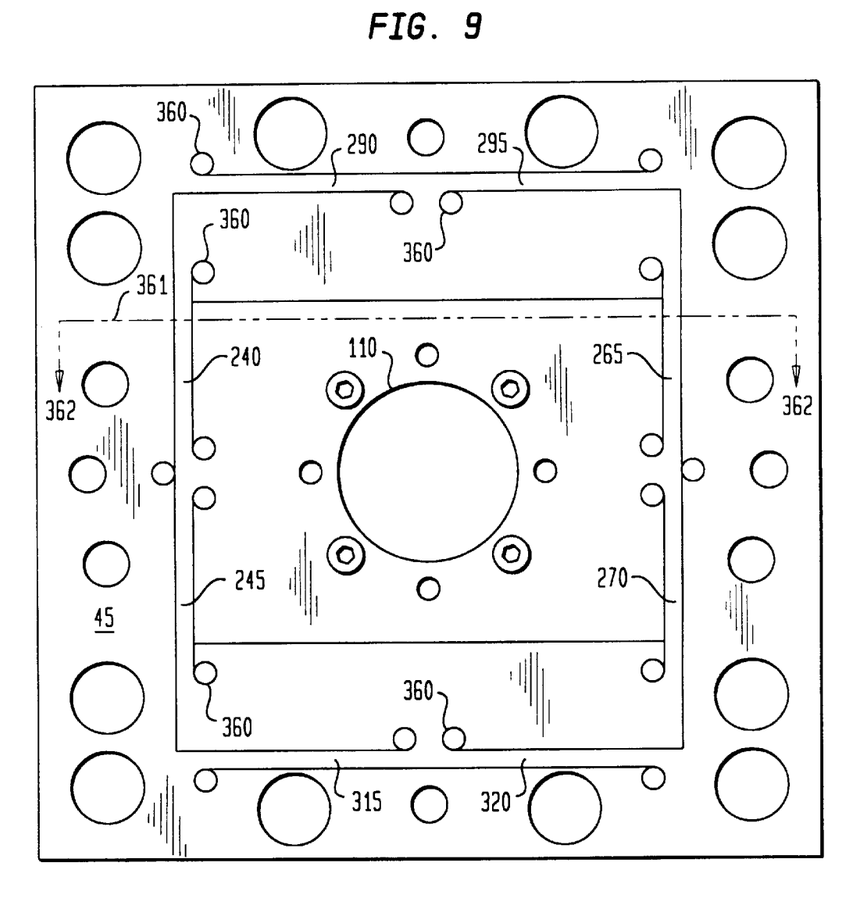
FIG. 9 is a more detailed view of the support plate of FIG. 8.

FIG. 9 provides a more detailed view of support plate 045 (configured for two-dimensional flotation). Holes 360, as shown in the figure, are advantageously provided at the end of each groove to provide stress relief, as is well understood in the art.

Figure 10:
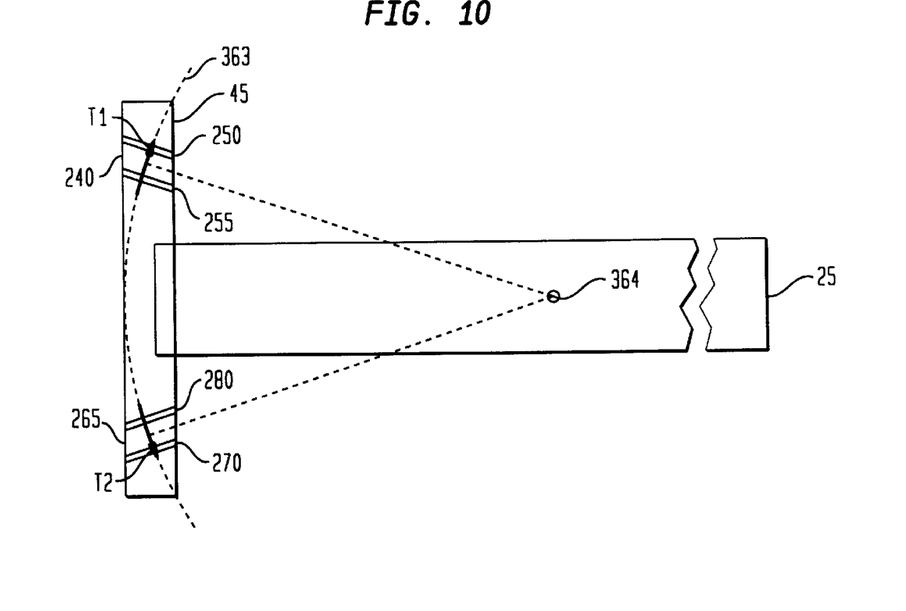
FIG. 10 is a schematic, sectional view through the collet and the support plate of FIG. 9, illustrating a preferred groove orientation.

It will be understood that in operation, the rocking of the collet in each plane of flotation will displace the appropriate central portion of each support plate along an arc lying in the respective plane of flotation. This is best illustrated in FIG. 10, which represents the view attained by cutting FIG. 8 along plane 361, and observing the exposed section by looking in the direction of arrows 362. Like elements of FIGS. 9 and 10 are identified by like reference numerals. However, the scale of various features in FIG. 10 is grossly distorted for clarity.

It will be appreciated from FIG. 10 that a central portion of plate 045 is displaced along arc 363, which is part of a circle drawn about center of rotation 364 of collet 025. A tangent T1, T2 to arc 363 is shown in the figure at the location of each of the beam springs 240, 265. Each beam spring may be described as a thin slab having parallel faces extending in the direction perpendicular to the plane of FIG. 10.

As noted, each beam spring is designed to be compliant to rocking in one plane of flotation. To avoid undesirable complexity in control algorithms, it is advantageous for the beam springs to behave linearly; i.e., for the spring constant to be independent of displacement. The closest approximation to linear behavior is achieved when the faces (perpendicular to the plane of the figure) are oriented perpendicularly to their respective tangents (e.g., tangent T1 for spring 240 and tangent T2 for spring 265).

Such an orientation can be achieved by cutting grooves 250, 255, 260, 275, 280, 285, 300, 305, 310, 325, 330, and 335 along a respective plane that is tilted relative to the front and back faces of plate 045 as shown, for example, in FIG. 10.

The greatest benefit is achieved when each groove is perpendicular to the corresponding tangent of arc 363. For typical geometries, at least some of the advantage of tilted grooves is retained when the groove inclination lies within, e.g., 5% of the optimum inclination.

In an exemplary embodiment of the invention, I have inclined the grooves at an angle of about 30 degrees from the axis perpendicular to the front and back faces of plate 045.

In an alternate embodiment, support plate 045 is configured for flotation in only a single direction. Such a configuration is depicted, in partially schematic fashion, in FIG. 11.

Figure 11:
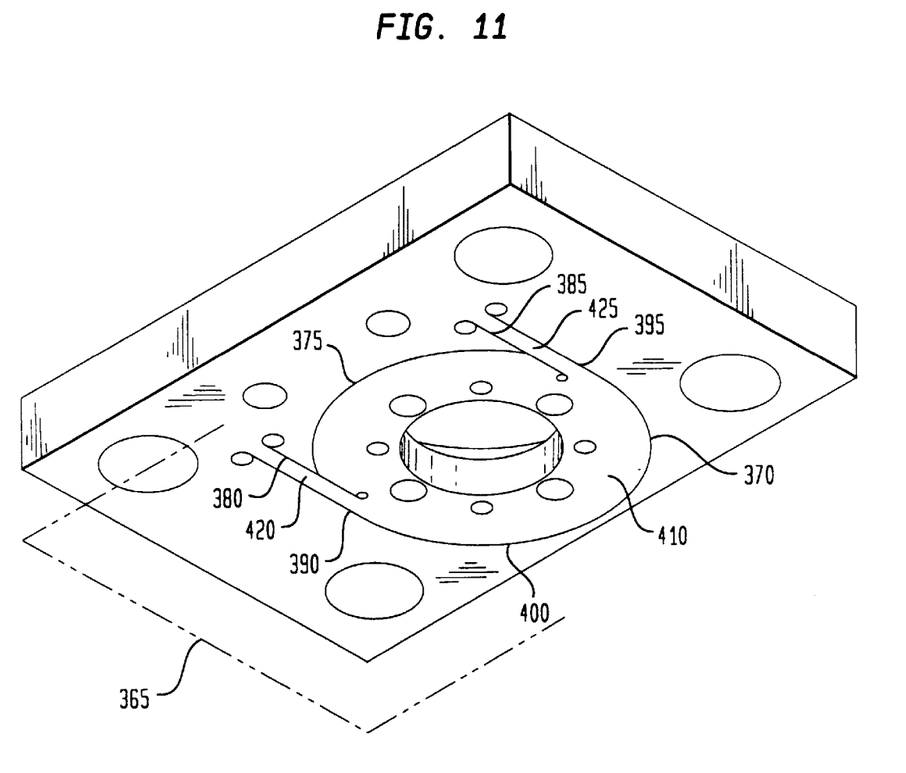
FIG. 11 is a perspective view of an alternative support plate having but one direction of flotation.

As seen in the figure, spring 365 is defined by lower groove 370, upper arcuate groove 375, and upper vertical grooves 380 and 385. Lower groove 370 includes vertical portions 390, 395 and arcuate portion 400.

Defined between groove 375 and groove portion 400 is ring 410. Ring 410 is suspended from beam spring 420, defined between groove 380 and groove portion 390, and from beam spring 425, defined between groove 385 and groove portion 395. Limitations on the permissible deflections of ring 410 are similar to the limitations, discussed above, on the deflections of the inner and outer plates of the support plate configured for two-dimensional flotation.

Electrical leads for the actuators are advantageously routed to an external driving circuit through one or more holes (not shown) drilled for that purpose in the clamp body and so placed as to intersect holes 061.

Control signals for the actuators are exemplarily generated by digital signal processors (DSPs) acting under the control of software programs which implement appropriate control algorithms. One DSP useful in this regard is the Super Harvard ARChitecture (SHARC) DSP, controlled through, e.g., an IBM-compatible personal computer. SHARC DSPs are manufactured by Analog Devices of Norwood, Mass. Board-mounted SHARC DSPs, which include auxiliary hardware, are commercially available from Bittware Research Systems of Concord, N.H., ALEX Computers of Ithaca, N.Y., and Integrated Computer Engines of Boston, Mass.

It is generally desirable to amplify the control signals before delivering them to the actuator. Those skilled in the art will recognize many commercially available amplifiers suitable for this purpose. A currently preferred amplifier is the Switched Capacitor AMPlifier (SCAMP) described, e.g., in U.S. Pat. No. 5,264,752. SCAMP amplifiers are advantageous because they are designed for light weight, and relatively low power consumption and heat dissipation.

Undesirable deflections of the cutting tool during boring operations are often characterized with reference to two principal directions: normal and tangential. The normal direction is the direction perpendicular to the surface of the (rotating) workpiece at the point of contact with the cutting tool. The tangential direction is the direction of the tangent to the workpiece, at the point of contact, in the local direction of motion of the workpiece surface. The actuation directions of the inventive support device are readily arranged to provide compensating deflections in one or both of these normal and tangential directions. When actuation is provided in both directions, it may be advantageous to provide a separate DSP, followed by a respective amplifier, for each direction.

Those skilled in the art will recognize various signal-processing techniques that, when implemented in the DSPs, are useful for generating appropriate control signals. Typically, such techniques will require, as input, an error signal (that is to be reduced) or a reference signal. One useful source of such signals is an accelerometer mounted on the boring bar at at, e.g., a location near the cutting tool. Separate accelerometers are readily provided for sensing, respectively, normal and tangential accelerations.

By way of example, the Rouch patent, which is hereby incorporated by reference, describes a signal-processing technique known as Modern Control Theory (MCT). Very briefly, MCT involves generating corrective actuator drive signals from linear combinations of sensor signals, scaled in magnitude by fixed real-valued coefficients. Thus, the corrective drive signals are nearly instantaneous representations of the state of the error-sensor output. This can lead to a wideband feedback-control system.

By way of further example, adaptive filtering techniques are advantageously applied for generating corrective actuator drive signals. An adaptive filter is a time-varying, self-adjusting, digital signal-processing device for controlling the performance of a system. Such a device acts upon an input signal (sometimes referred to as a reference signal) and produces an output signal. The system performance depends, at least in part, on this output signal. The filter automatically optimizes its processing of the input signal (this process is referred to as adaptation) in order to minimize the difference between the actual and desired system performance. A specific type of adaptive filter, referred to as a transversal filter, processes the input signal by linearly combining sequential time-samples of the input signal at various fixed delays, with respective variable weights.

U.S. patent application Ser. No. 08/640,396, which is hereby incorporated by reference, describes an application of adaptive filtering techniques for suppressing vibration during boring and other machining operations.

As noted, sensors, such as accelerometers, are usefully mounted on the boring bar to provide error signals or reference signals. As also noted, one advantage of the inventive device is that it does not require the use of boring bars that have been specially designed to accommodate integral equipment (which will typically include built-in mechanical actuators, but may also include built-in sensors).

Thus, the practitioner has the choice of using a special boring bar having one or more built-in sensors, or of using an ordinary boring bar that has been modified for mounting one or more sensors thereto. In the second case, it will generally suffice to perform minor modifications that have no significant effect on the mechanical performance of the boring bar. For example, in an exemplary embodiment, we have drilled a pair of small cavities in a boring bar to accommodate accelerometers, and have drilled a small borehole down the length of the boring bar for guiding the electrical leads from the accelerometers. Alternatively, well-known methods may be used for mounting accelerometers to an outside surface of the boring bar, and electrical leads (or, e.g., optical fibers in the case of optical sensor output) may be guided along the outside of the boring bar.

Figure 12:
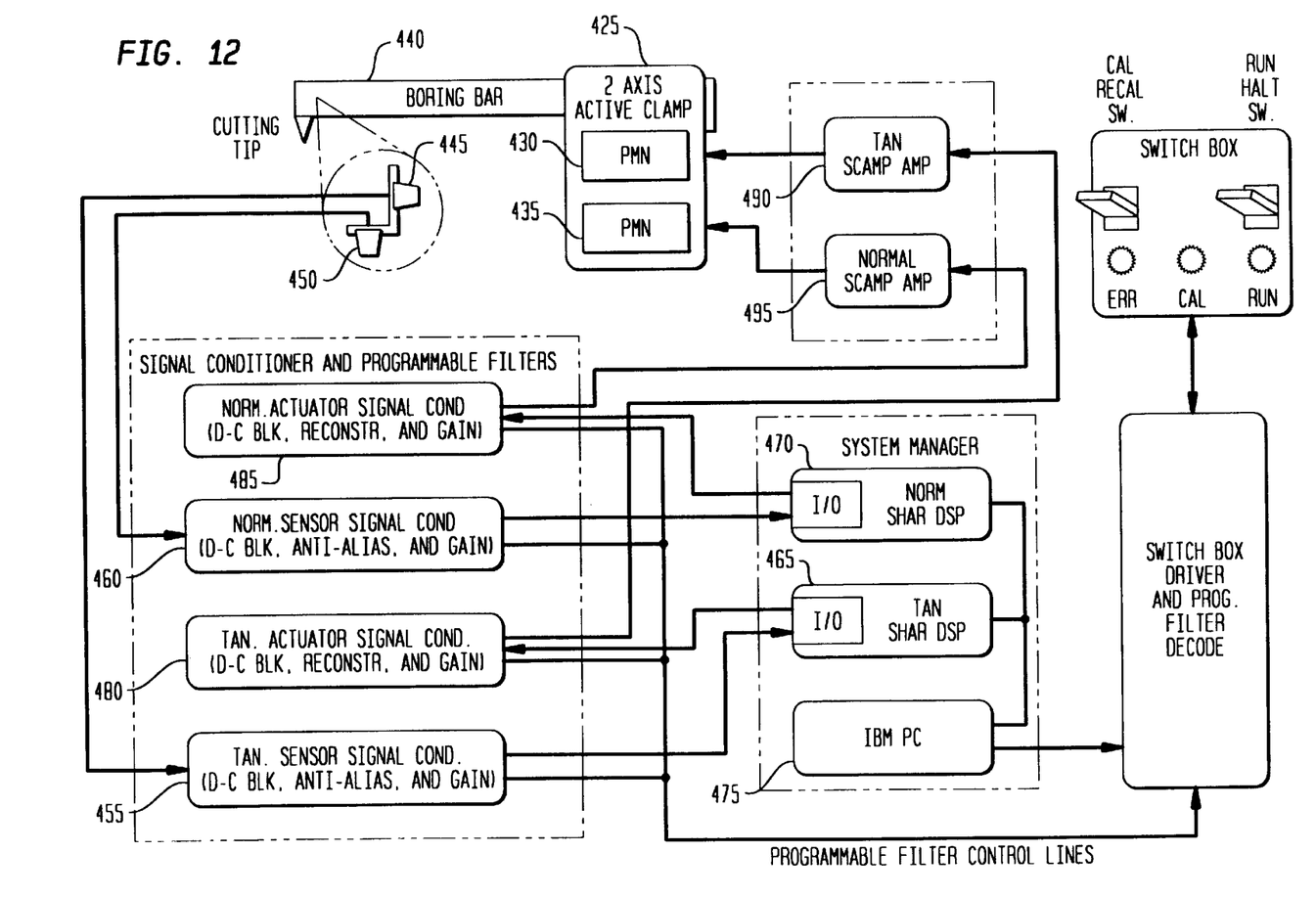
FIG. 12 is a block diagram of a boring installation according to the invention in one embodiment.

FIG. 12 depicts, in schematic fashion, a boring installation that includes an active control system. Support device 425 includes tangential actuator 430 and normal actuator 435. Mounted to boring bar 440 are tangential accelerometer 445 and normal accelerometer 450. The output signals from the accelerometers pass through respective conditioning circuits 455, 460 (which include analog-to-digital converters and signal-conditioning filters), and thence into the respective tangential and normal DSPs 465, 470. As shown in the figure, a user interface to the DSPs is provided by personal computer 475. Control signals from the respective DSPs pass through respective conditioning circuits 480, 485 (which include signal-conditioning filters and digital-to-analog converters), and thence into respective tangential and normal amplifiers 490, 495. The respective amplifier output signals are fed into tangential and normal actuators 430, 435.

Although the above discussion has mainly addressed applications to the art of metal boring, it will be appreciated that the inventive support device has further ranging applications. Broadly, the inventive device is useful for supporting a mechanical beam at a location nearer one end of the beam than the other, and for controlling motions of the more distant end of the beam. A boring bar is but one example of such a beam. Other examples are a mast (e.g. for propulsion or communication), a gun barrel, a telescope tube, and a tool holder for a lathe or other turning machine for shaping a workpiece. Those skilled in the art will recognize yet further applications that still do not depart from the spirit of the invention.

The invention claimed is:

1. Apparatus for supporting a beam having a longitudinal axis, comprising:
   a) a clamping assembly that surrounds and grips a portion of the beam, said assembly relatively compliant to deflections of the beam in at least one direction transverse to the axis, but relatively resistant to axial displacements of the beam and to torsional rotations of the beam about the axis; and
   b) actuation means that comprise at least one actuator situated externally to the beam and arranged to urge the beam in the compliant direction.

2. Apparatus of claim 1, wherein:
   (a) the actuation means comprise at least two actuators situated externally to the beam and offset from each other at different axial positions along the beam; and
   (b) the actuators are arranged to urge the beam in opposite transverse directions, such that rotational deflections of the beam are produced about an axis lying between the actuators, wherein said axis is perpendicular to the longitudinal axis and to the compliant direction.

3. Apparatus of claim 1, wherein:
   (a) the clamping assembly is relatively compliant in a first transverse direction and in a second transverse direction perpendicular to said first direction;
   (b) the actuation means comprise a first group of at least two actuators situated externally to the beam and offset from each other at different axial positions along the beam, wherein the first actuators are arranged to urge the beam in the first transverse direction;
   (c) the actuation means further comprises a second group of at least two actuators situated externally to the beam and offset from each other at different axial positions along the beam, wherein the second actuators are arranged to urge the beam in the second transverse direction;
   (d) the actuators of each of said first and second groups are arranged to urge the beam in opposite transverse directions, such that rotational deflections of the beam are produced about an axis lying between the actuators, wherein said axis is perpendicular to the longitudinal axis and to the corresponding compliant direction.

4. Apparatus of claim 2, wherein:
   a) the clamping assembly comprises a spaced-apart pair of plates;
   b) each plate comprises a central portion and a peripheral portion;
   c) an opening is defined in each central portion for passage therethrough of a portion of the beam;
   d) each central portion is partially circumscribed by a pattern of grooves; and
   e) each groove pattern defines at least two beam springs, integral with the plate, that support the central portion and couple the central portion to the peripheral portion.

5. Apparatus of claim 4, wherein, in each said plate, the central portion is defined between the central opening and the groove pattern as a ring suspended from two parallel beam springs.

6. Apparatus of claim 3, wherein:
   a) the clamping assembly comprises a spaced-apart pair of plates;
   b) each plate comprises a central portion and a peripheral portion;
   c) an opening is defined in each central portion for passage therethrough of a portion of the beam;
   d) each central portion is partially circumscribed by a pattern of grooves; and
   e) each groove pattern defines a plurality of beam springs, integral with the plate, that support the central portion and couple the central portion to the peripheral portion.

7. Apparatus of claim 6, wherein:
   a) the plurality of beam springs comprises at least two beam springs, to be referred to as inner springs, that are relatively compliant to deflections in a first transverse direction; and
   b) said plurality further comprises at least two beam springs, to be referred to as outer springs, that are relatively compliant to deflections in a second transverse direction perpendicular to the first transverse direction.

8. Apparatus of claim 7, wherein:
   a) a first set of grooves defines an inner rectangle about the central opening;
   b) a second set of grooves defines an outer rectangle about the inner rectangle, the outer rectangle having two pairs of opposing sides to be referred to, respectively, as outer spring sides and inner spring sides;
   c) a third set of grooves consists of two grooves situated outside the outer rectangle, each said groove extending adjacent and substantially parallel to a respective outer spring side of the outer rectangle;
   d) an outer spring is defined between each groove of the third set and the adjacent outer spring side;
   e) an inner spring is defined between each inner spring side and an adjacent substantially parallel side of the inner rectangle;
   f) each outer spring side of the outer rectangle is interrupted by a tab, integral with the plate, that joins the corresponding outer spring to a portion of the plate situated medially thereof; and
   g) each spring-defining side of the inner rectangle is interrupted by a tab, integral with the plate, that joins the corresponding inner spring to a portion of the plate situated medially thereof.

9. Apparatus of claim 1, wherein:
a) the clamping assembly comprises a collet;
b) defined within the collet is a central bore for receiving therewithin a portion of the beam; and
c) the collet is adapted for gripping said portion of the beam.

10. Apparatus of claim 9, wherein:
a) the clamping assembly further comprises at least a first plate;
b) defined within the plate is an opening for passage therethrough of a portion of the beam; and
c) the collet is adapted to be fastened to the plate.

11. Apparatus of claim 9, wherein:
a) the clamping assembly comprises a spaced-apart pair of plates;
b) defined within each plate is an opening for passage therethrough of a portion of the beam;
c) the collet has two ends; and
d) the collet is adapted to be fastened at each end to a respective plate.

12. Apparatus for supporting a beam having a longitudinal axis, comprising:
a) a collet adapted to slidingly receive a portion of the beam and to grip said beam portion; and
b) at least one suspension element attached to the collet; wherein:
c) the suspension element is relatively compliant to displacements of the collet in at least one direction transverse to the beam axis;
d) the suspension element is relatively resistant to displacements of the collet along the beam axis; and
e) the suspension element is relatively resistant to torsional rotations of the collet about the beam axis.

13. Apparatus of claim 12, wherein:
a) the suspension element comprises a plate;
b) the plate comprises a central portion and a peripheral portion;
c) an opening is defined in the central portion for passage therethrough of a portion of the beam;
d) the central portion is partially circumscribed by a pattern of grooves; and
e) the groove pattern defines at least two beam springs, integral with the plate, that support the central portion and couple the central portion to the peripheral portion.

14. Apparatus of claim 13, wherein the central portion is defined between the central opening and the groove pattern as a ring suspended from two parallel beam springs.

15. Apparatus of claim 13, wherein:
a) said beam springs, to be referred to as inner springs, are relatively compliant to deflections in a first transverse direction;
b) the groove pattern defines at least two further beam springs, to be referred to as outer springs, that, further support the central portion and couple the central portion to the peripheral portion; and
c) the outer springs are relatively compliant to deflections in a second transverse direction that is perpendicular to the first transverse direction.

16. Apparatus of claim 15, wherein:
a) a first set of grooves defines an inner rectangle about the central opening;
b) a second set of grooves defines an outer rectangle about the inner rectangle, the outer rectangle having two pairs of opposing sides to be referred to, respectively, as outer spring sides and inner spring sides;
c) a third set of grooves consists of two grooves situated outside the outer rectangle, each said groove extending adjacent and substantially parallel to a respective outer spring side of the outer rectangle;
d) an outer spring is defined between each groove of the third set and the adjacent outer spring side;
e) an inner spring is defined between each inner spring side and an adjacent substantially parallel side of the inner rectangle;
f) each outer spring side of the outer rectangle is interrupted by a tab, integral with the plate, that joins the corresponding outer spring to a portion of the plate situated medially thereof; and
g) each spring-defining side of the inner rectangle is interrupted by a tab, integral with the plate, that joins the corresponding inner spring to a portion of the plate situated medially thereof.

17. A boring machine that comprises a clamp for supporting a boring bar along a longitudinal axis, characterized in that
(a) the clamp comprises at least two actuators external to the boring bar,
(b) the actuators are offset from each other along the longitudinal axis;
(c) each actuator is arranged to urge the boring bar in a direction transverse to the longitudinal axis; and
(d) the actuators are arranged to urge the boring bar in opposite directions, whereby an actuation plane common to the two actuators is defined, and thereby to produce rotational deflections of the boring bar about an axis perpendicular to the common actuation plane.

18. A boring machine that comprises a clamp for supporting a boring bar along a longitudinal axis, characterized in that
(a) the clamp comprises a first and a second group of actuators external to the boring bar, each group comprising at least two actuators;
(b) the actuators of each group are offset from each other along the longitudinal axis;
(c) each actuator of the first group is arranged to urge the boring bar in a first direction transverse to the longitudinal axis;
(d) each actuator of the second group is arranged to urge the boring bar in a second direction transverse to the longitudinal axis;
(e) the first transverse direction is perpendicular to the second transverse direction;
(f) the actuators of the first group are arranged to urge the boring bar in opposite directions, whereby a first actuation plane common to said actuators is defined, and thereby to produce rotational deflections of the boring bar about an axis perpendicular to the first common actuation plane; and
(g) the actuators of the second group are arranged to urge the boring bar in opposite directions, whereby there is defined a second actuation plane common to said actuators and perpendicular to the first actuation plane, and thereby to produce rotational deflections of the boring bar about an axis perpendicular to the second common actuation plane.

19. A boring machine comprising:
a) a clamp assembly adapted to support a boring bar,
b) at least one actuation system for imparting corrective motions to the boring bar during boring operations; and c) a control unit for generating signals to drive the actuation system;

characterized in that:

d) the clamp assembly is relatively compliant to at least some transverse deflections of the boring bar;

e) the actuation system comprises at least two actuators situated outside of the boring bar and arranged to apply external, transverse forces thereto; and f) the actuators are further arranged to produce rotational deflections of the boring bar, in a said compliant direction, about an axis passing through the boring bar.

20. A method for subtractively shaping a rotating workpiece, comprising:

a) supporting an end of a beam in a clamping assembly, the clamping assembly further comprising one or more actuators, wherein the one or more actuators are external to the beam;

b) supporting a cutting tool at or near the other end of the beam; and c) while supporting the cutting tool, operating the one or more actuators, thereby to apply corrective forces to the beam, characterized in that d) the corrective forces are applied to the beam so as to produce transverse, rotational deflections of the beam about at least one axis passing through the beam.

21. The method of claim 20, further comprising: generating control signals for driving the actuators.

22. The method of claim 21, wherein:

a) the method further comprises sensing motions of the beam at one or more locations nearer to the cutting tool than to any of the actuators, thereby to generate sensor output signals; and b) the control signals are generated, at least in part, in response to the sensor output signals.

* * * * *